United States Patent [19]

Williams

[11] Patent Number: 4,478,464
[45] Date of Patent: Oct. 23, 1984

[54] RACK-MOUNTABLE STORAGE ENCLOSURE FOR DIFFERENTLY SIZED MAGNETIC TAPE ENCLOSURES

[76] Inventor: Jerry B. Williams, 4900 Wetheredsville Rd., Baltimore, Md. 21207

[21] Appl. No.: 325,654

[22] Filed: Nov. 30, 1981

[51] Int. Cl.[3] ............................................. A47B 81/06
[52] U.S. Cl. .......................................... 312/9; 312/12; 312/111; 312/242; 312/320; 206/387; 211/40
[58] Field of Search ..................... 312/8, 9, 10, 11, 12, 312/13, 111, 320, 244, 242; 206/387; 211/40, 41

[56] References Cited

U.S. PATENT DOCUMENTS

| | | | |
|---|---|---|---|
| 2,238,451 | 4/1941 | Roth | 211/40 |
| 3,247,424 | 4/1966 | Kossoy et al. | 211/41 |
| 3,271,626 | 9/1966 | Howrilka | 211/41 |
| 3,685,684 | 8/1972 | Schindler et al. | 206/387 |
| 3,907,116 | 9/1975 | Wolf et al. | 211/40 |
| 4,026,615 | 5/1977 | Tazaki et al. | 312/20 |
| 4,084,865 | 4/1978 | Joyce | 206/387 |
| 4,117,931 | 10/1978 | Berkman | 206/387 |
| 4,184,726 | 1/1980 | Cox | 312/320 |
| 4,231,473 | 11/1980 | Aprahamian | 211/40 |
| 4,275,943 | 6/1981 | Gelardi et al. | 206/387 |

FOREIGN PATENT DOCUMENTS 1503568  3/1978  United Kingdom .................. 312/9

Primary Examiner—Victor N. Sakran
Attorney, Agent, or Firm—Woodard, Weikart, Emhardt & Naughton

[57] ABSTRACT

A rack-mountable tape cartridge enclosure device for storing multi-sized tape cartridges such as audio and video cassettes, computer, eight-track and other types of data storage cartridges. A generally box-like front loading enclosure containing a plurality of parallel vertical dividers to separate the cartridges. Each divider has at least two vertical portions, each portion being of greater width than those above. Interlocking corrugations on the sides of the enclosures provide for connecting two or more devices. Detachable mounting members not only include such corrugations for attachment to an enclosure, but also contain screw or bolt holes to mount the enclosure unit in a standard equipment rack.

7 Claims, 9 Drawing Figures

RACK-MOUNTABLE STORAGE ENCLOSURE FOR DIFFERENTLY SIZED MAGNETIC TAPE ENCLOSURES

BACKGROUND OF THE INVENTION

1. Field of the Invention

This invention relates generally to electronic data storage containers, and more particularly to a magnetic tape cartridge enclosure device that can be modular and mounted in a standard equipment rack, and which can compactly store a variety of audio and video cassettes, computer, eight-track or other types of data storage cartridges.

2. Description of the Prior Art

A number of different types of tape storage devices are available on the market. For example, U.S. Pat. No. 3,907,116, issued Sept. 23, 1975 to Wolf et al., describes an enclosure which stores both boxed and unboxed tape cassettes. Short opposing shelves with recesses provide for vertical stacking of the cassettes. However, this device has no means for mounting the storage enclosure in an equipment rack.

U.S. Pat. No. 4,231,473 issued Nov. 4, 1980 to Aprahamian, discloses an insert adapted to store boxed cassette tapes and eight-track tapes in longitudinal troughs. The insert is convoluted and uses partitions, guide walls, shelves and spacing members to store the tapes. Tapes are accepted through the top of a carrying case containing the insert.

The utility container described in U.S. Pat. No. 4,084,865 issued Apr. 18, 1978 to Joyce, includes eight-track and cassette tape inserts. These inserts include parallel vertical laterally-spaced dividers of constant width that store the cartridges between them. Differently dimensioned inserts handle cassettes or eight-tracks separately, and no provision is made for mounting in an equipment rack.

A printed circuit card holder is described in U.S. Pat. No. 3,247,424 issued Apr. 19, 1966 to E. L. Kossoy et al. This holder accepts printed circuit cards from the front, which are secured by individual channeled guide members. Slotted flanges at the front of the holder provide for its attachment to a suitable support.

Heretofore, no industry has yet provided an electronic data housing storage device which can be mounted in a standard electronic equipment rack. The present invention has that capability and provides a new way of compactly storing electronic data housings of different sizes and types.

SUMMARY OF THE INVENTION

In the present invention, a tape cartridge enclosure device that can be modular and mounted in a standard equipment rack, and can compactly store a variety of audio and video cassettes, computer, eight-track and other types of tape cartridges. Of course, while the actual nature of the invention covered herein can be determined only with reference to the claims appended hereto, certain features which are characteristic of the preferred embodiment of the novel cartridge enclosure disclosed herein can be described briefly.

One object of the invention is to compactly store different sized cartridges. To this effect, laterally spaced dividers are arranged in parallel as partitions in a storage enclosure. Each divider has a plurality of portions of differing but uniform widths, with the widths decreasing as elevation increases, therein defining different sized compartments. Tapes are stored between the dividers in the appropriate compartments.

Another object of the invention is to provide a modular capability for increased applicability. This is attained in part in the preferred embodiment through slidably interlocking corrugations on the sides of the enclosure which permit attachment thereto of additional enclosures.

Yet another object of the invention is the ability to mount the enclosure in a standard equipment rack. Thus, the enclosure may be fitted with a pair of detachable rack mounts which are provided with the aforementioned slidably interlocking corrugations. Additionally, the exterior dimensions of the enclosure and mounting members are adapted to fit an applicable equipment rack.

DESCRIPTION OF THE PREFERRED EMBODIMENT

Figure 1:
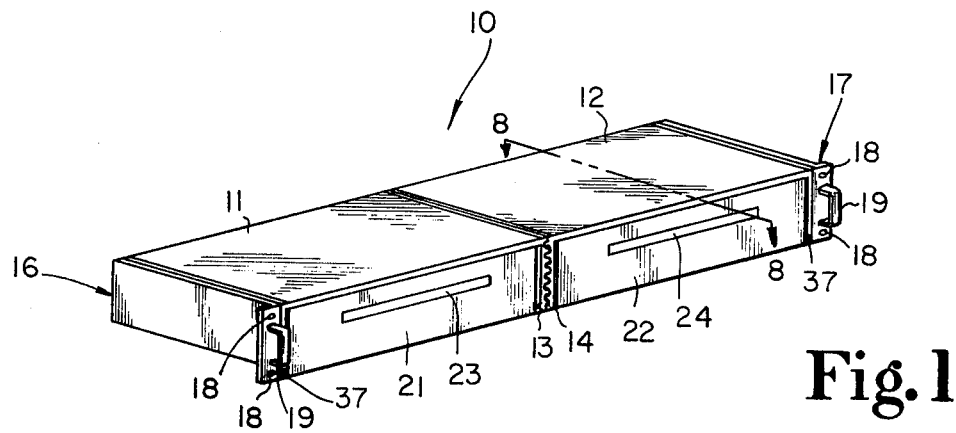
FIG. 1 is a perspective view of a pair of interlocked cartridge enclosure devices with attached mounting members ready for attachment in a standard equipment rack.

For the purpose of promoting an understanding of the principles of the invention, reference will now be made to the embodiment illustrated in the drawings, and specific language will be used to describe the same. It will, nevertheless, be understood that no limitation of the scope of the invention is thereby intended, such as alterations and further modifications of the illustrated device, and further applications of the principles of the invention as illustrated therein being contemplated as would normally occur to one skilled in the art to which the invention relates.

Referring now to FIG. 1, tape enclosure unit 10 comprises individual enclosure devices 11 and 12 connected to each other by interlocking means 13 and 14 and attached to mounting members 16 and 17, respectively. Mounting members 16 and 17 each contain pairs of apertures 18 and handle 19 and are symmetric with respect to those portions. Apertures 18 facilitate attachment of unit 10 in a standard equipment rack (not shown), i.e. they act as screw or bolt holes. Front access panels 21 and 22 allow access to the interior of enclosure devices 11 and 12 and contain depressions 23 and 24, respectively, to assist in opening the panels.

Figures 2, 3:
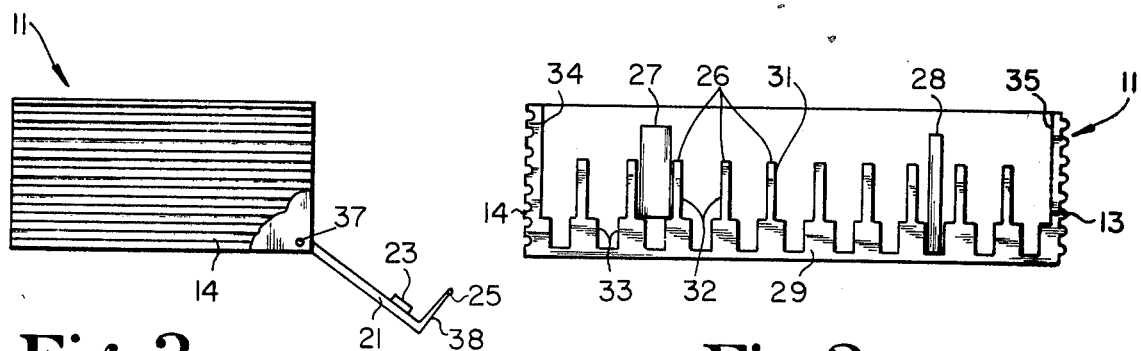
FIG. 2 is a front elevation view of the preferred enclosure device with the front access panel removed.
FIG. 3 is a side elevation view of the preferred enclosure device showing the preferred corrugations and an open access panel.

FIG. 2 displays a view of the interior of a preferred enclosure device, e.g. device 11. A plurality of dividers 26 are located therein. Each divider 26 runs from the front to the back of enclosure 11 and is parallel to the other dividers 26. The distance between the dividers 26 and the shape of the dividers both depend upon the number of different sized cartridges to be stored and their dimensions. While other types of cartridges, such as those used for video recorders, could be stored in enclosure device 11, the preferred embodiment provides for storage only of boxed and unboxed cassette tapes. The general principle in designing the dividers is to store wider cartridges at higher elevations and only one cartridge at a time, e.g. boxed cassette 27 or unboxed cassette 28, between any pair of adjacent dividers 26. Hence, in the preferred embodiment, dividers 26 have two portions of generally constant but different widths, a lower wider portion 29 and an upper narrower portion 31. The distance 32 between upper portions 31 of adjacent dividers 26 is at least the width of a boxed cassette, while the distance 33 between lower portions 29 of adjacent dividers 26 is at least the width of an unboxed cassette but less than the width of a boxed cassette.

The sides 34 and 35 of enclosure device 11 form interlocking means 13 and 14, respectively, for securing device 11 to a second such device, e.g. enclosure device 12 of FIG. 1, or mounting members such as 16 and 17 of FIG. 1. Interlocking means 13 and 14 comprise two inversely contoured types of corrugations. That is, the corrugations of means 13 are parallel elongated protrusions having constant, nearly circular cross sections which extend from the front to the rear edges of side 35. The corrugations comprising means 14 are parallel elongated depressions having constant, nearly circular cross sections which extend from the front to the rear edges of side 34. The dimensions of said corrugations are such that a pair of enclosure devices, such as devices 11 and 12, will slide together from front to back, their corrugations interlocking and preventing separation thereof by relative movement other than that of front to back.

FIG. 3 shows a side view of enclosure 11 displaying the corrugations of interlocking means 14 from another angle. Access panel 21 with depression 23 is shown open, revealing the location of hinges 37 at the lower sides of panel 21 where they allow the top 38 of panel 21 to swing out and down. Appendage 25 of front access panel is contoured to facilitate in locking the panel to tape enclosure unit 10.

Figure 4:
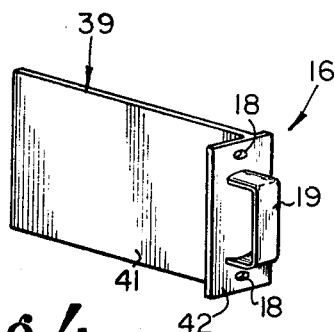
FIG. 4 is a perspective view of the preferred left side mounting member.
Figure 6:
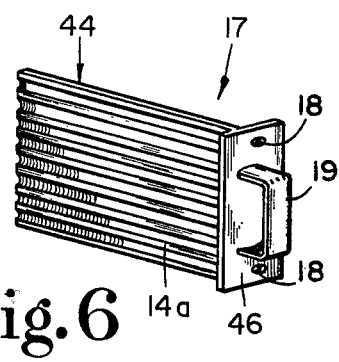
FIG. 6 is a perspective view of the preferred right side mounting member.
Figure 5:
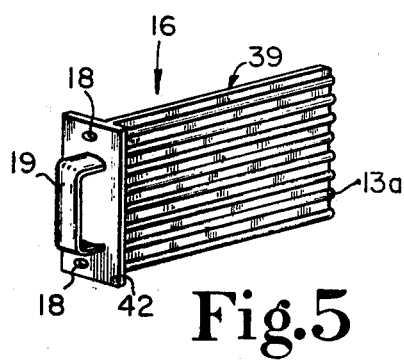
FIG. 5 is another perspective view of the preferred left side mounting member.
Figure 7:
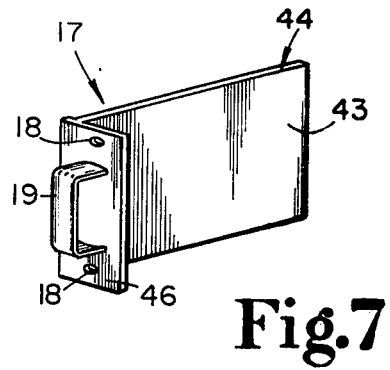
FIG. 7 is another perspective view of the preferred right side mounting member.

FIGS. 4 and 5 show expanded views of mounting member 16. Corrugations 13a, identical with those of interlocking means 13, described above, are found on one side of side plate 39. The other side 41 is smooth. The corrugations 13a of side plate 39 will slidably engage the interlocking means 14 of an enclosure device to attach member 16 thereto. Integral with side plate 39 is frontally located flange 42 which, when member 16 is attached to an enclosure, is substantially parallel to the front of said enclosure. Flange 42 contains apertures 18 and handle 19 as described above. FIGS. 6 and 7 show similar expanded views of mounting member 17. In this case however, the opposite side 43 of side plate 44 is smooth. That side which is not smooth has corrugations 14a identical with those of interlocking means 14. The corrugations 14a of side plate 44 will slidably engage the interlocking means 13 of an enclosure device to attach member 17 thereto. Integral with side plate 44, is frontally located flange 46 which, when member 17 is attached to an enclosure, is substantially parallel to the front of said enclosure. Flange 46 contains apertures 18 and handle 19 as described above.

Figure 8:
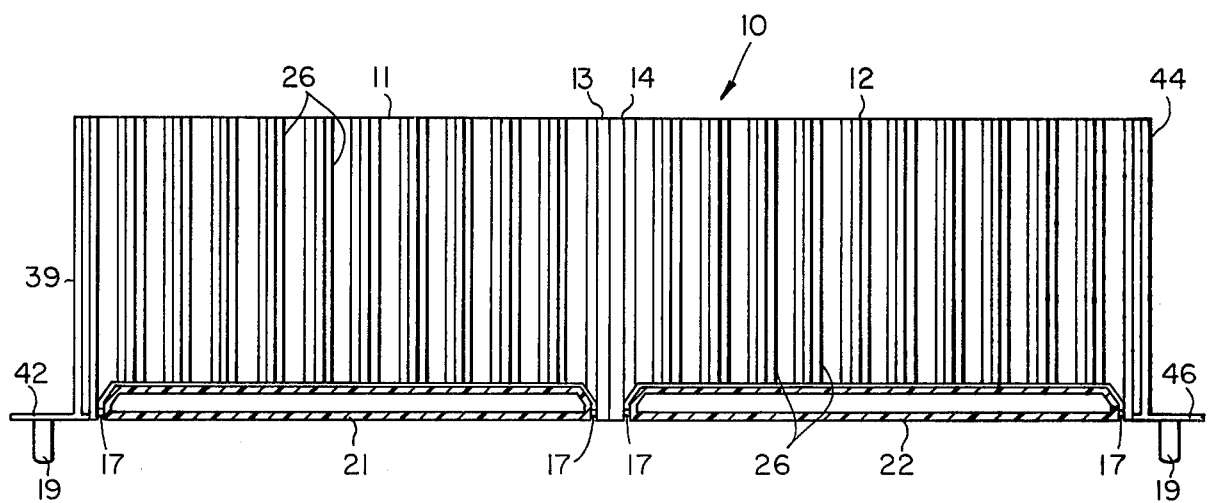
FIG. 8 is a top section view of a pair of interlocked cartridge enclosure devices with attached mounting members as seen looking along line 8—8 of FIG. 1.

FIG. 8 displays a top section view of tape enclosure unit 10 showing the parallel arrangement of dividers 26.

Figure 9:
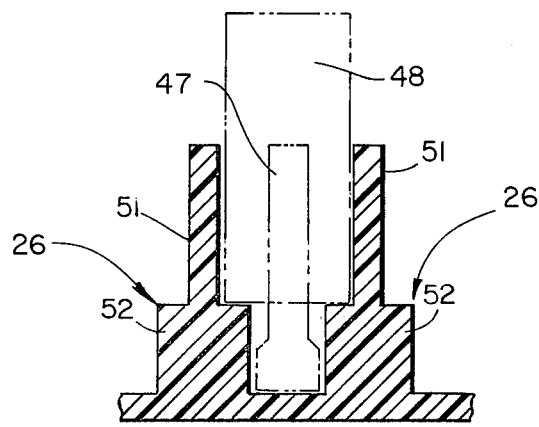
FIG. 9 is a cross section view of a pair of dividers contoured to handle a plurality of cartridge sizes.

FIG. 9 shows an alternate embodiment of dividers 26 designed to handle two sizes of cartridges. These cartridges 47, and 48 are shown in phantom. As explained above, while each portion has a generally constant width, the widths of differing portions of each divider increase as elevation decreases. Alternatively, one might say that the compartments between each pair of adjacent dividers 26 have portions whose widths are generally constant but increase from portion to portion with elevation. Accordingly, the distance between lowest portions 53 of adjacent dividers is only slightly larger than the width of cartridge 47; the distance between upper portions 52 of adjacent dividers is only slightly larger than the width of cartridge 48. Clearly by increasing the number and/or changing the size of the portions of dividers 26, nearly any combination of cartridge sizes can be accommodated by enclosure 11 or 12.

While the invention has been illustrated and described in detail in the drawings and foregoing description, the same is to be considered as only illustrative and not restrictive in character, it being understood that only the preferred embodiment has been shown and described and that all changes and modifications that come within the spirit of the invention are desired to be protected. As an example, the references to "sides" of the storage device is intended to demonstrate attachment to the top side and the bottom side, as well as the right side and left side. This permits the formation of an array of enclosures larger than the pair shown in the drawings. (A two-by-two or two-by-three array would function well with interlocking means placed on four sides of each of the enclosures.)

What is claimed is:

1. A rack-mountable tape cartridge enclosure device for storing multi-sized cartridges, comprising:
   (a) an enclosure having a generally box-like shape;
   (b) means therein for storing said cartridges in a parallel arrangement, including a plurality of dividers contoured to handle a plurality of cartridge sizes;
   (c) interlocking means for securing said enclosure to a second such enclosure on either side thereof, said interlocking means being fixed relative to said enclosure, integral with a side thereof, and adapted to interlock with corresponding means on said second enclosure;
   (d) a plurality of mounting members detachably secured to the sides of said enclosure, said members each having a flange substantially parallel to the front of said enclosure, said flanges having apertures therein to facilitate attachment to a standard equipment rack.

2. The cartridge enclosure device of claim 1 wherein: said interlocking means includes a corrugated exterior surface of the side of said enclosure, said corrugations extend from the front to the rear edges of the side of said enclosure, are straight and parallel, and have constant cross sections, said means being designed and adapted to slidingly engage the correspondingly contoured side of a second enclosure.

3. The cartridge enclosure device of claim 2 wherein:

(a) said dividers extend upward from the base of said enclosure and segment the space therein into parallel compartments;

(b) each said divider having a plurality of portions, each portion of greater width than the portions above; and (c) said compartments accordingly having a plurality of portions, each portion of lesser width than the portions above, to facilitate the storage of cartridges of different sizes.

4. The cartridge enclosure device of claim 2 wherein:

(a) said mounting members each further includes a side plate connected to said flange, said plate having a corrugated side;

(b) said corrugations extend from the front to the rear edges of said side plate, are straight and parallel, and have constant cross sections; and (c) said mounting members being designed and adapted to slidingly engage the correspondingly corrugated side of said enclosure.

5. The cartridge enclosure device of claim 2 wherein: said enclosure includes a generally rectangular access panel in the front thereof for access to the space therein.

6. The cartridge enclosure device of claim 5 wherein: said access panel is hinged at its lower edge to swing its upper edge down and out.

7. The cartridge enclosure device of claim 2 wherein: said enclosure describes a right rectangular prism having a height of about 3½ inches to fit a conventional equipment rack.

* * * * *